(12) United States Patent
Furuichi et al.

(10) Patent No.: US 11,030,321 B2
(45) Date of Patent: Jun. 8, 2021

(54) PROCESSING AND EVALUATING DATA BASED ON ASSOCIATED DEVICE VULNERABILITY

(71) Applicant: International Business Machines Corporation, Armonk, NY (US)

(72) Inventors: Sanehiro Furuichi, Setagaya-ku (JP); Akira Saito, Ichikawa (JP); Takuya Mishina, Sagamihara (JP); Hiroaki Uetsuki, Machida (JP)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 16/149,316

(22) Filed: Oct. 2, 2018

(65) Prior Publication Data

US 2020/0104509 A1   Apr. 2, 2020

(51) Int. Cl.
| | |
|---|---|
| *G06F 21/57* | (2013.01) |
| *H04L 29/06* | (2006.01) |
| *G06K 9/62* | (2006.01) |
| *G06F 21/55* | (2013.01) |
| *G06F 21/50* | (2013.01) |

(52) U.S. Cl.
CPC .......... *G06F 21/577* (2013.01); *G06F 21/552* (2013.01); *G06K 9/6267* (2013.01); *H04L 63/1433* (2013.01); *G06F 21/50* (2013.01); *G06F 21/554* (2013.01); *H04L 63/14* (2013.01); *H04L 63/1441* (2013.01)

(58) Field of Classification Search
CPC ...... G06F 21/577; G06F 21/552; G06F 21/50; G06F 21/57; G06F 21/55; H04L 63/14; H04L 63/1433; H04L 63/1441; H04L 63/1408; H04L 63/1416; H04L 63/1483
See application file for complete search history.

(56) References Cited

U.S. PATENT DOCUMENTS

| | | | |
|---|---|---|---|
| 8,984,643 B1 * | 3/2015 | Krisher | H04L 63/1433 726/25 |
| 10,484,485 B2 * | 11/2019 | Liu | G06F 9/5072 |
| 10,574,700 B1 * | 2/2020 | Dell'Amico | H04L 41/28 |
| 2011/0119765 A1 * | 5/2011 | Hering | H04L 63/1433 726/25 |
| 2016/0301707 A1 | 10/2016 | Cheng et al. | |
| 2017/0054744 A1 * | 2/2017 | Mumcuoglu | H04L 63/1441 |

(Continued)

FOREIGN PATENT DOCUMENTS

| | | |
|---|---|---|
| CN | 107204969 A | 9/2017 |
| WO | 2014076773 A1 | 5/2014 |

*Primary Examiner* — Kristine L Kincaid
*Assistant Examiner* — Shaqueal D Wade
(74) *Attorney, Agent, or Firm* — Patterson + Sheridan, LLP

(57) ABSTRACT

Techniques for analyzing data based on the vulnerability of the corresponding device are provided. A plurality of devices are classified into a plurality of groups based on respective measures of vulnerability associated with each device, and a respective weighting factor is determined for each respective group of the plurality of groups based at least in part on a number of devices included in the respective group. An evidentiary value of data received from a first device of the plurality of devices is modified, based on the respective weighting factor associated with the first device. Further, a probable state of a physical environment is determined, based in part on the data received from the first device.

20 Claims, 9 Drawing Sheets

(56) References Cited

U.S. PATENT DOCUMENTS

| | | |
|---|---|---|
| 2017/0126704 A1 | 5/2017 | Nandha Premnath et al. |
| 2017/0213038 A1 | 7/2017 | Shabtai et al. |
| 2019/0238584 A1* | 8/2019 | Somasundaram .. H04L 63/1433 |

* cited by examiner

PROCESSING AND EVALUATING DATA BASED ON ASSOCIATED DEVICE VULNERABILITY

BACKGROUND

The present invention relates to processing and analyzing data based in part on vulnerability of the device that provided the data, and more specifically, to classifying and weighting data based on vulnerability similarities between devices.

Internet of Things (IoT) devices are becoming increasingly common, which enables drastically improved data analytics for a large variety of implementations. As a result of increasing prevalence of IoT technology, it has become possible to aggregate data sent from a huge number of devices on a cloud system, and to analyze the data to provide various services. IoT devices, however, frequently suffer from resource constraint and poor connectivity. Because of this, the firmware or software of the device cannot be easily fixed by applying a patch or updating the device, even when a vulnerability is discovered. As the number of IoT devices increases, so too does the risk associated with vulnerabilities. For example, a large number of cases of simultaneous attacks exploiting vulnerabilities of IoT devices have recently come to light.

SUMMARY

According to one embodiment of the present disclosure, a method is provided. The method includes classifying a plurality of devices into a plurality of groups based on respective measures of vulnerability associated with each device, and determining a respective weighting factor for each respective group of the plurality of groups based at least in part on a number of devices included in the respective group. The method further includes modifying an evidentiary value of data received from a first device of the plurality of devices, based on the respective weighting factor associated with the first device. Finally, the method includes determining a probable state of a physical environment, based in part on the data received from the first device.

According to a second embodiment of the present disclosure, a computer program product is provided. The computer program product includes a computer-readable storage medium having computer-readable program code embodied therewith, the computer-readable program code executable by one or more computer processors to perform an operation. The operation includes classifying a plurality of devices into a plurality of groups based on respective measures of vulnerability associated with each device, and determining a respective weighting factor for each respective group of the plurality of groups based at least in part on a number of devices included in the respective group. The operation further includes modifying an evidentiary value of data received from a first device of the plurality of devices, based on the respective weighting factor associated with the first device. Finally, the operation includes determining a probable state of a physical environment, based in part on the data received from the first device.

According to a third embodiment of the present disclosure, a system is provided. The system includes one or more computer processors, and a memory containing a program which when executed by the one or more computer processors performs an operation. The operation includes classifying a plurality of devices into a plurality of groups based on respective measures of vulnerability associated with each device, and determining a respective weighting factor for each respective group of the plurality of groups based at least in part on a number of devices included in the respective group. The operation further includes modifying an evidentiary value of data received from a first device of the plurality of devices, based on the respective weighting factor associated with the first device. Finally, the operation includes determining a probable state of a physical environment, based in part on the data received from the first device.

DETAILED DESCRIPTION

Unlike more traditional devices, IoT devices frequently include vulnerabilities that are not, or cannot be, easily or quickly resolved. For example, a given IoT device may lack the computing resources (e.g., memory, storage, bandwidth, and the like) to implement an upgrade or solution. As used herein, an IoT device is any computing device (such as an embedded device) that can transmit data to one or more centralized devices for processing or analysis. For example, IoT devices can include wearables such as smart watches, as well as appliances, lights, switches, cars and trucks, stoplights, weather stations, signs and roadways, and the like. Some IoT devices include one or more sensors to obtain information from the surrounding environment. In embodiments, this data can be transmitted from the IoT device to one or more centralized devices (such as cloud devices) to analyze and process the data, in order to determine the state of the physical environment surrounding the device, provide services to users, transmit commands to the IoT devices, and the like.

Embodiments of the present disclosure provide techniques for analyzing, on a cloud system, data aggregated from many IoT devices with the understanding that many IoT devices in use in the world have vulnerabilities. Embodiments disclosed herein provide a mechanism which ensures that, even when widespread attacks exploiting a particular vulnerability occur, the impact on services and data analysis is limited. In an embodiment, the data is analyzed in part by utilizing weighting information generated for the IoT devices so as to maintain diversity of information in terms of the individual vulnerabilities of each device.

Figure 1:
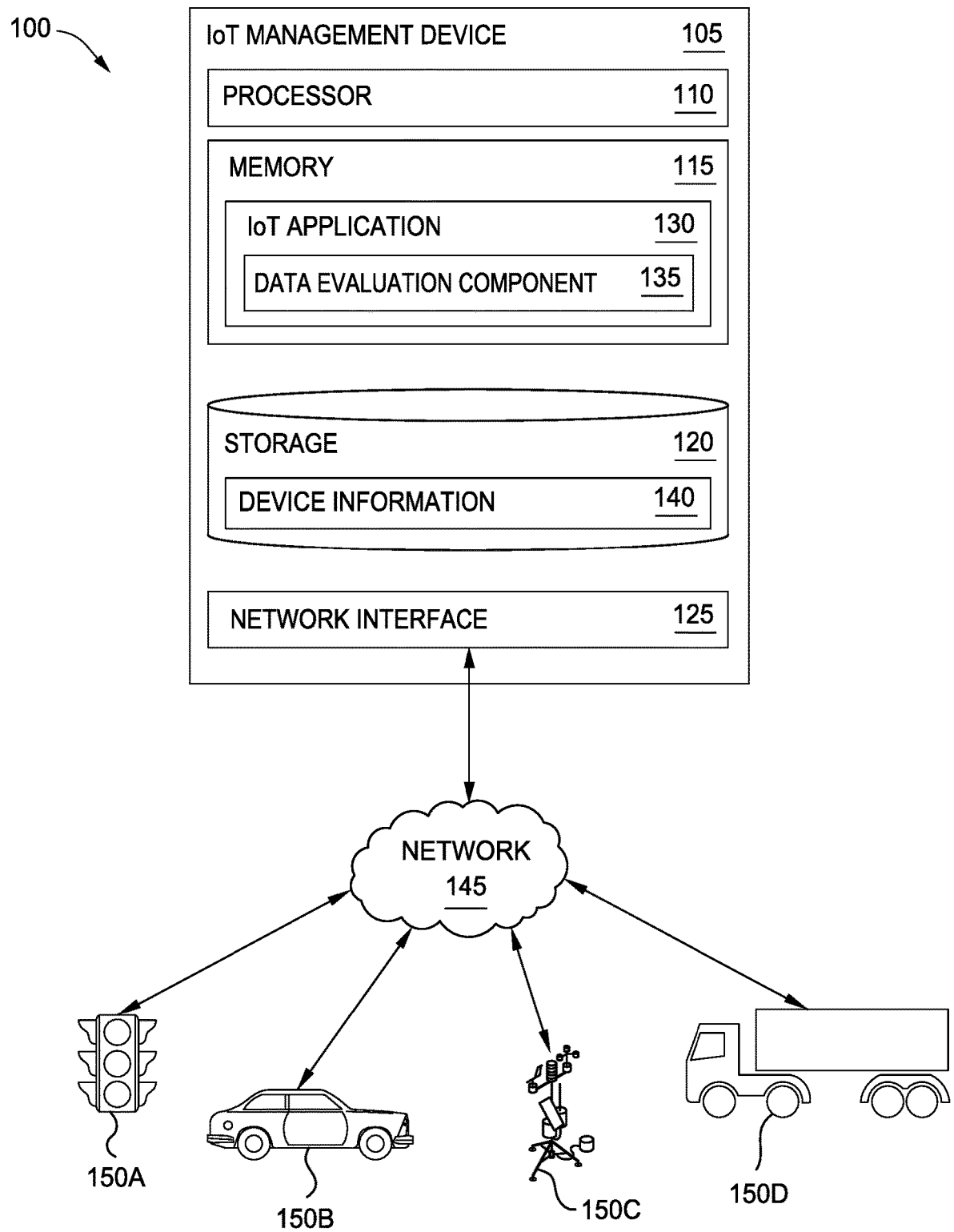
FIG. 1 illustrates a system configured to analyze and evaluate data based on device vulnerability, according to one embodiment disclosed herein.

FIG. 1 illustrates a system 100 configured to analyze and evaluate data based on device vulnerability, according to one embodiment disclosed herein. In the illustrated embodiment, an IoT Management Device 105 is communicatively coupled with a set of IoT Devices 150A-D via a Network 145. Illustratively, the IoT Devices 150A-D include a smart traffic light 150A, a car 150B, a weather station 150C, and a truck 150D. For example, in one embodiment, the IoT Device 150A transmits information about vehicular and pedestrian traffic, and receives commands to operate and reduce traffic buildups. Similarly, in an embodiment, the IoT Devices 150B and 150D record data such as current speed, location, weather, traffic, and the like, and receive information such as optimal routes, forecasts, warnings, and the like. In some embodiments, the IoT Devices 150B and 150D are partially or entirely self-driving. Further, in an embodiment, the IoT Device 150C records and transmits weather phenomena such as wind speed and direction, precipitation, temperature, and the like. Although traffic and weather devices are used herein for illustration, embodiments of the present disclosure can be applied to any purpose.

In the illustrated embodiment, the IoT Management Device 105 includes a Processor 110, a Memory 115, Storage 120, and a Network Interface 125. As illustrated, Processor 110 retrieves and executes programming instructions stored in Memory 115 as well as stores and retrieves application data residing in Storage 120. Processor 110 is representative of a single CPU, multiple CPUs, a single CPU having multiple processing cores, and the like. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). Through the Network Interface 125, the IoT Management Device 105 can be communicatively coupled with other devices, including data stores, IoT Devices 150, terminals or devices used by users or administrators, and the like. Although illustrated as a single device, in some embodiments, the IoT Management Device 105 operates as a cluster or grid of devices. Further, although illustrated as a physical device, in embodiments, the IoT Management Device 105 may operate via software, hardware, or a combination of hardware and software.

In the illustrated embodiment, the Storage 120 includes Device Information 140 about one or more of the IoT Devices 150. In an embodiment, this Device Information 140 can include configuration information of the corresponding IoT Device 150 (including the hardware, software, and/or firmware present on the device), a list of known vulnerabilities associated with the device's configuration, a vulnerability measure, a category or group the device belongs to, weighting information or evidentiary value for the IoT Device 150, and the like. As illustrated, the Memory 115 includes an IoT Application 130, which includes a Data Evaluation Component 135. Although not included in the illustrated embodiment of FIG. 1, in embodiments, the IoT Application 130 can include various other components, as discussed in more detail below with reference to FIG. 2.

In one embodiment, the Data Evaluation Component 135 receives configuration information for IoT Devices 150 and classifies or categorizes them into groups based in part on this information. For example, in one embodiment, the IoT Application 130 receives configuration information for each IoT Device 150. In some embodiments, the IoT Application 130 can access one or more data stores to retrieve this configuration information (such as stored by a management system). In some embodiments, the Data Evaluation Component 135 accesses one or more data stores to retrieve information relating to known vulnerabilities. In one embodiment, this data can be searched or parsed based in part on the configuration of affected devices. That is, in one embodiment, given the hardware, software, and/or firmware present on a particular IoT Device 150, the IoT Application 130 can determine which vulnerabilities affect the particular device. In some embodiments, the vulnerability information also includes a category for each vulnerability (e.g., what type of vulnerability it is), a risk level associated with the vulnerability, and the like.

In one embodiment, the Data Evaluation Component 135 generates device groupings for the IoT Devices 150, based on measures of similarity between the devices, with respect to the vulnerabilities each suffers from. In embodiments, the Data Evaluation Component 135 also generates and assigns a weighting factor to each group of devices, such that data received from IoT Devices 150 in a particular group is weighted using the defined weighting factor to modify the evidentiary value of the data. In one embodiment, the weighting factor is based in part on the number of devices in the corresponding group. In some embodiments, the weighting factor is inversely related to the number of devices in the group. In some embodiments, the weighting factor is adjusted to ensure that the data from each group of devices is accorded equal weight, regardless of the number of devices in the group. For example, in such an embodiment, a first group with two devices may have a weighting factor of ½ or 50%, while a second group with four devices has a weighting factor of ¼ or 25%. In this way, the data from two devices in the second group has as much evidentiary value as data from a single device in the first group. For example, in such an embodiment, if the data provided by a first device in the first group conflicts with the data provided by a second device in the second group (e.g., the first device reports a traffic incident, while the second device reports all-clear), the IoT Management Device 105 may determine that there has been a traffic incident, because the data from the first device is allocated higher evidentiary value.

In an embodiment, the IoT Application 130 uses this data to determine the state of the physical surroundings of the IoT Devices 150. In some embodiments, this comprises identifying events in the physical environment. For example, suppose the IoT devices 150 capture traffic data. In such an embodiment, based on the aggregated data, the IoT Application 130 can determine whether there is an accident or traffic problem, what the current weather is, and the like. As used herein, an event may be relatively immediate (e.g., a traffic collision) or extended and/or ongoing (e.g., traffic jams or delays, precipitation, and the like). In embodiments, each IoT Device 150 transmits data indicating the state of the environment (e.g., what obstacles are detected, whether traffic is present, what the weather is, and the like). The IoT Application 130 can then determine the state of the environment (or determine the most likely or probable state) by aggregating the information provided by each IoT Device 150. However, because one or more of the IoT Devices 150 may be compromised (and therefore send incorrect or misleading data), in embodiments disclosed herein, the IoT Application 130 modifies the evidentiary value of each device based on their vulnerabilities. This allows the IoT Application 130 to determine the probable state of the environment without being confuses or misled by compromised devices.

As another example, suppose the IoT Management Device 105 collects data from IoT Devices 150 embedded in manufacturing equipment in a smart factory. In such an embodiment, the sensor data can include things such as temperature (e.g., of air, of water, oil, coolant, or some other fluid, of a machine or chamber, etc.) pressure, deflection, noise level, power consumption, and the like. Based on this data, in an embodiment, the IoT Management Device 105 can determine the probable state of the factory (e.g., the temperature of a fluid, the pressure in a tank, etc.) using the techniques described herein. Examples embodiments such as monitoring traffic, weather, factories, and the like are discussed herein. However, these examples are purely illustrative, and are not limiting on the present disclosure. Embodiments of the present disclosure can be readily applied to a wide variety of IoT Devices 150 and data collection.

In some embodiments, the IoT Application 130 also considers the risk factors associated with each group when determining an appropriate weighting factor for the group. For example, in one embodiment, each vulnerability is associated with a risk level, and the overall risk measure for a particular IoT Device 150 is defined by the aggregate risk of its vulnerabilities and/or the number of vulnerabilities. Further, in some embodiments, the risk associated with a group of devices is the aggregate or average of the risk of its constituent devices, and/or the average number of vulnerabilities for its devices. In such an embodiment, the IoT Application 130 can further reduce the weight of a group that has a relatively high risk factor, in order to reflect the increased probability that the group has been compromised by an attack.

Further, in some embodiments, the IoT Application 130 utilizes the generated groupings to identify outliers in the data. For example, rather than analyze data from individual IoT Devices 150 to identify outliers, in one embodiment, the IoT Application 130 aggregates the data within each grouping, and determines whether any particular group appears to be anomalous. In an embodiment, if representative data from a group is determined to be an outlier, the data from the entire group is ignored in determining the current state of the environment (e.g., what events have occurred or are occurring).

Figure 2:
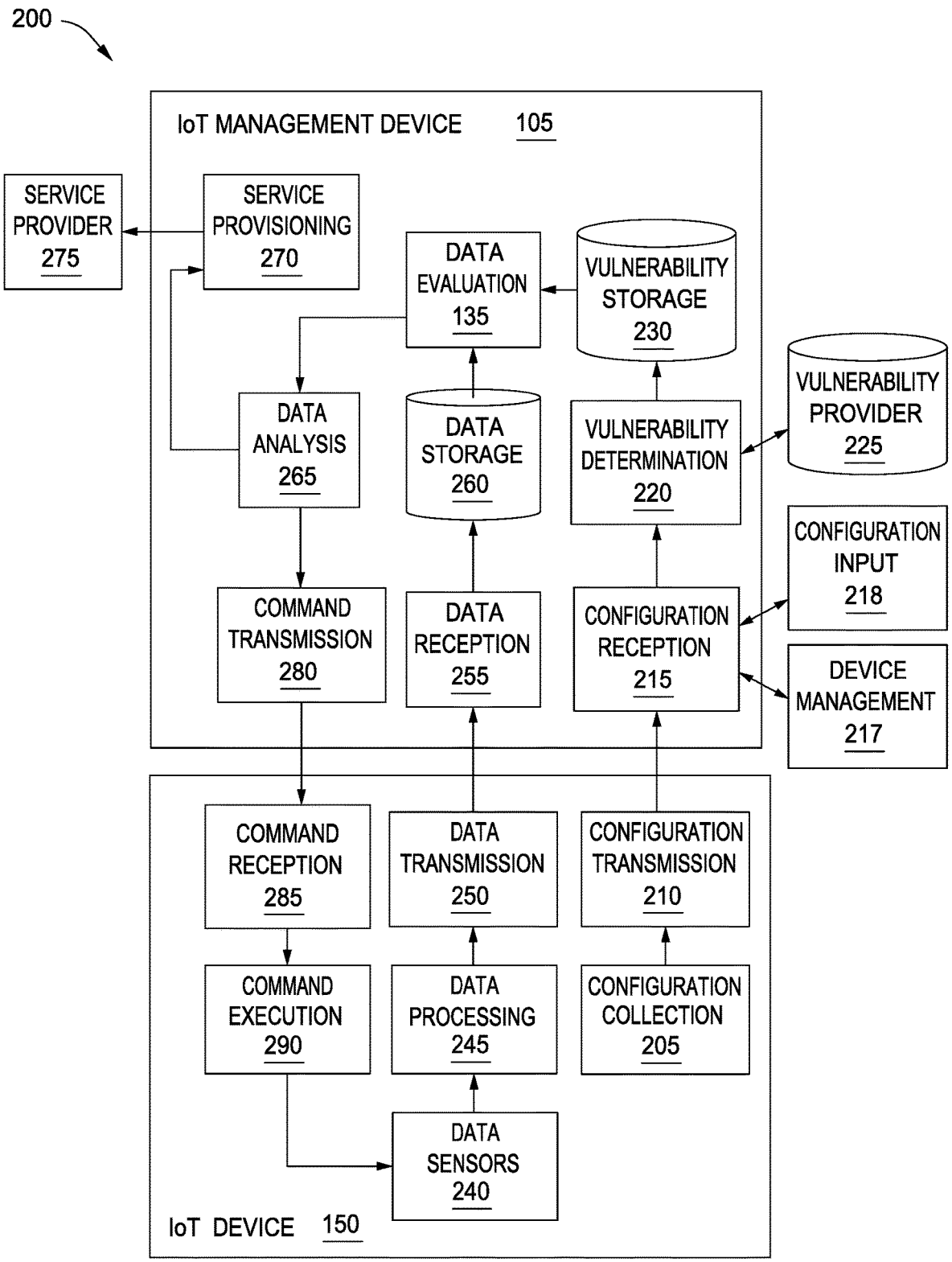
FIG. 2 is a block diagram illustrating a system for analyzing data based on device vulnerability, according to one embodiment disclosed herein.

FIG. 2 is a block diagram illustrating a system 200 for analyzing data based on device vulnerability, according to one embodiment disclosed herein. In the illustrated embodiment, the IoT Management Device 105 is communicatively coupled with an IoT Device 150. Although a single IoT Device 150 is illustrated, in embodiments, there may of course be any number of IoT Devices 150 in communication with the IoT Management Device 105. In the illustrated embodiment, the IoT Management Device 105 is also communicatively coupled with one or more data stores, labeled Vulnerability Provider 225, that identify known vulnerabilities, and the devices that are affected by each vulnerability. For example, in one embodiment, the Vulnerability Provider 225 provides a database that the IoT Management Device 105 can search based on hardware, firmware, software, and the like, to identify any vulnerabilities that are associated with the particular configuration. In some embodiments, the Vulnerability Provider 225 provides a list of vulnerabilities, which the IoT Management Device 105 parses to identify IoT Devices 150 that are at risk for each.

As further illustrated, the system 200 includes a component for Configuration Input 218, and a component for Device Management 217. In some embodiments, in addition to each IoT Device 150 providing its own configuration information (or instead of receiving the data directly from the IoT Devices 150), the Configuration Input 218 and Device Management 217 also provide this information. For example, in one embodiment, the Configuration Input 218 allows an administrator or operator to input the configuration information manually. Similarly, in an embodiment, the Device Management 217 allows the Configuration Reception 215 to receive information from a management system, such as one used to provide firmware updates to the devices. Additionally, in the illustrated embodiment, a Service Provider 275 is communicatively linked to the IoT Management Device 105 in order to provide various services to users of the IoT Devices 150. Such services can include allocation of computing resources, as well as other services such as route planning (e.g., from one physical location to another), warning or notification generation, adjusting settings or configurations of devices, and the like.

In the illustrated embodiment, the IoT Device 150 includes components and/or blocks for Configuration Collection 205, Configuration Transmission 210, Data Sensors 240, Data Processing 245, Data Transmission 250, Command Reception 285, and Command Execution 290. Although illustrated as discrete units for clarity, in embodiments, the operations of each component or block may be combined or distributed among any number of logical units. Further, the operations of each unit can be implemented in software, hardware, or a combination of software and hardware.

In the illustrated embodiment, the block for Configuration Collection 205 involves determining, by the IoT Device 150, what the current configuration of the device is. In embodiments, this can include determining the particular hardware, firmware, operating system, and software that is executing or present on the IoT Device 150. Further, the Configuration Transmission 210 transmits this configuration information to the IoT Management Device 105 via a network. In one embodiment, the IoT Device 150 provides this configuration information upon receiving a request for such information. In other embodiments, the IoT Device 150 transmits this information to the IoT Management Device 105 without receiving such a request. In some embodiments, the IoT Device 150 periodically re-transmits this information. In one embodiment, each time the configuration changes, the IoT Device 150 notifies the IoT Management Device 105 of the updated configuration.

As illustrated, the Data Sensors 240 are used to sense and record data from the environment surrounding the IoT Device 150, as well as the state of the IoT Device 150 itself. For example, in various embodiments, the Data Sensors 240 can include precipitation sensors, wind direction and speed sensors, sensors for object detection (such as via radar, LIDAR, sonic sensors, and the like), fuel level sensors, speedometers, and the like. As illustrated, the data from these Data Sensors 240 is processed via the component for Data Processing 245. In various embodiments, the Data Processing 245 can include smoothing the data, packaging it for transmission, and the like. The block for Data Transmission 250 transmits this sensor data to the IoT Management Device 105.

Further, in the illustrated embodiment, the component for Command Reception 285 receives commands or instructions from the IoT Management Device 105. Additionally, the block for Command Execution 290 implements those commands. For example, in embodiments, the commands may include directing use of the Data Sensors 240, modifying configuration or status of the IoT Device 150, providing output to a user (via a visual display, audio, tactile feedback, and the like), actuating one or more actuators, and the like.

As illustrated, the IoT Management Device 105 includes components and/or blocks for Configuration Reception 215, Vulnerability Determination 220, Vulnerability Storage 230, Data Evaluation 135, Data Reception 255, Data Storage 260, Data Analysis 265, Service Provisioning 270, and Command Transmission 280. Although illustrated as discrete units for clarity, in embodiments, the operations of each component or block may be combined or distributed among any number of logical units. Further, the operations of each unit can be implemented in software, hardware, or a combination of software and hardware.

In the illustrated embodiment, the block for Configuration Reception 215 receives configuration information about each IoT Device 150. As illustrated, this information may be received directly from one or more IoT Devices 150, as well as from other sources such as the Configuration Input 218 and the Device Management 217. At block 220, the IoT Management Device 105 performs Vulnerability Determination. As illustrated, this determination is based on the configuration received from each IoT Device 150, as well as information provided by a Vulnerability Provider 225. In an embodiment, the Vulnerability Determination 220 comprises, for each IoT Device 150, comparing the corresponding configuration to the information about known vulnerabilities to determine which vulnerabilities affect the respective IoT Device 150.

In one embodiment, the Vulnerability Determination 220 includes assigning a measure of vulnerability to each IoT Device 150. In one embodiment, the measure of vulnerability is an n-dimensional vector v, where each element indicates the presence or absence of a respective known vulnerability. In one embodiment, the value of the k-th element, $v_k$, is set to a predefined value (e.g., one) if the corresponding vulnerability is present for the IoT Device 150, and a second value (e.g., zero) if the vulnerability does not affect the device. In some embodiments, the Vulnerability Determination 220 also includes determining a level of risk for the IoT Device 150. For example, in one embodiment, the Vulnerability Provider 225 indicates a level of risk for each known vulnerability. This level of risk can be based on the effect of the vulnerability (e.g., what data or control an attacker would have access to), the ease with which the vulnerability can be exploited (e.g., the computing resources or technical skill required), whether the vulnerability is actively being exploited by attackers, and the like.

In one embodiment, the level of risk for each IoT Device 150 is generated by aggregating the individual risks for each vulnerability that the IoT Device 150 is affected by. For example, in embodiments, the individual risk scores can be summed or averaged in order to determine the risk level of the device. As illustrated, the vulnerability information for each IoT Device 150 is stored in the Vulnerability Storage 230. In the illustrated embodiment, the component for Data Reception 255 receives sensor data from each IoT Device 150. In an embodiment, this data is buffered in the Data Storage 260. In some embodiments, the IoT Management Device 105 processes the data continuously (e.g., in a stream). In other embodiments, the IoT Management Device 105 processes the data in batches. In one embodiment, the Data Evaluation 135 analyzes batches of data that correspond to particular windows of time, from any number of IoT Devices 150. For example, in an embodiment, the Data Evaluation 135 includes analyzing data collected between t=0 and t=1, then data recorded between t=1 and t=2, and so on. In some embodiments, the Data Storage 260 buffers data for a period of time (e.g., one second), then forwards all of the data received during that window to be processed and evaluated.

As illustrated, the Data Evaluation 135 utilizes both the data from the IoT Devices 150, as well as the vulnerability information associated with each IoT Device 150. In embodiments, the Data Evaluation 135 includes generating device groupings, assigning a weighting factor for each group, and modifying the evidentiary value of data received from each IoT Device 150 based on the weighting information, as discussed below in more detail. In the illustrated embodiment, this data, with adjusted evidentiary value, is then analyzed at the Data Analysis 265. In embodiments, the Data Analysis 265 includes any analysis of the sensor data that the IoT Management Device 105 utilizes to make decisions. For example, in embodiments, the Data Analysis 265 includes determining the current state of the area surrounding the IoT Devices 150 (e.g., determining what is going on based on the sensor readings), or identifying whether an event is occurring or has occurred (e.g., whether it is raining at a particular location, whether traffic delays are present, and the like). In embodiments, the Data Analysis 265 is performed by aggregating data from a number of IoT Devices 150, taking into account the evidentiary value of each device, as discussed in more detail below.

In the illustrated embodiment, based on this analysis, a component for Service Provisioning 270 requests or provisions any services that are appropriate (such as generating route information, allocating resources, and the like). As further illustrated, based on the Data Analysis 265, commands can be generated and transmitted to the IoT Devices 150 at Command Transmission 280. In this way, the IoT Management Device 105 can ensure a diverse set of data is utilized to perform Data Analysis 265, because the evidentiary weight of each piece of data is modified based on the group to which the associated device belongs. This enables more accurate and robust determinations regarding the state of the physical world, and can ensure improved service provisioning with reduced risk due to the various vulnerabilities.

Figure 3:
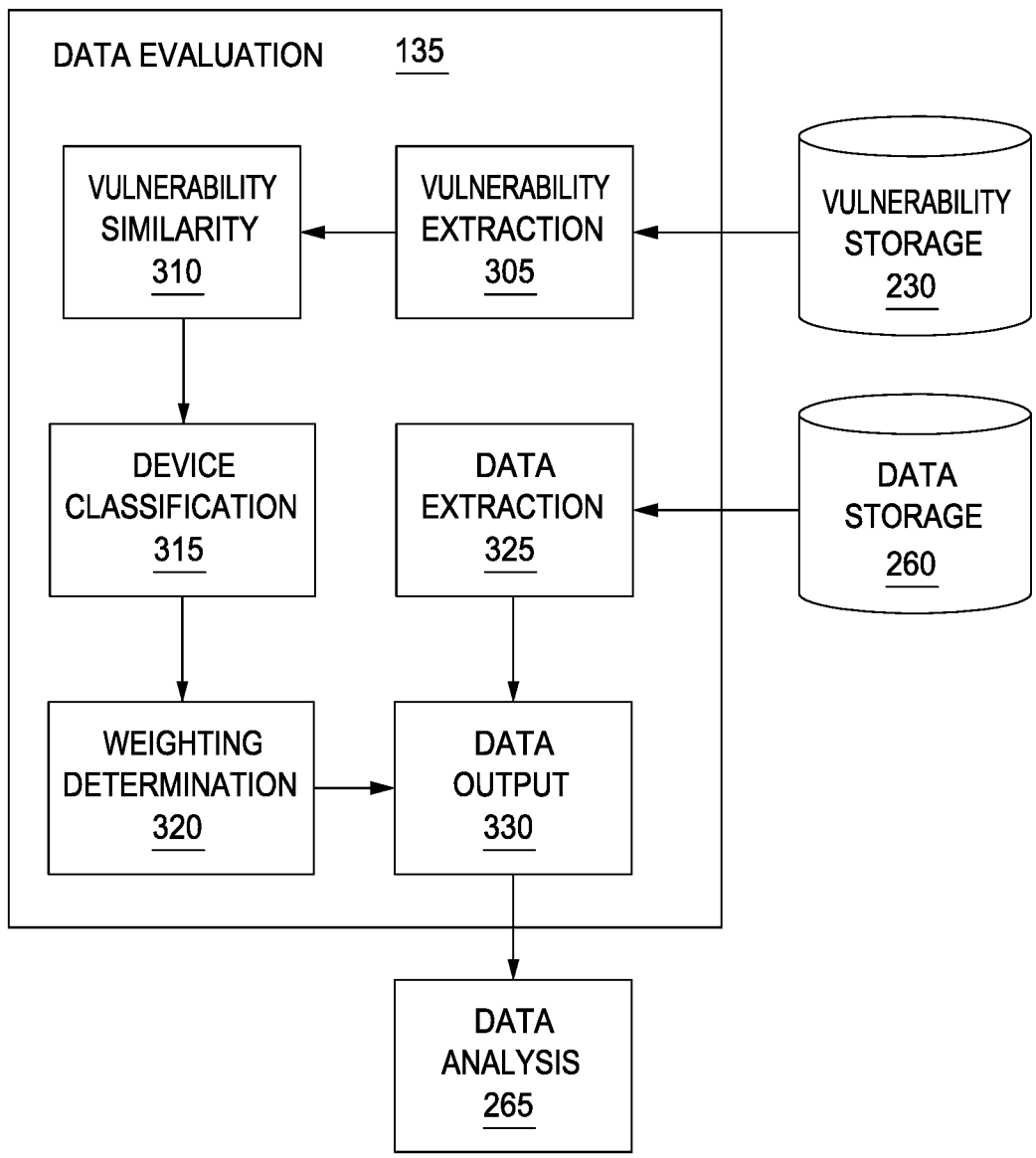
FIG. 3 is a block diagram illustrating components used for data evaluation based on device vulnerability, according to one embodiment disclosed herein.

FIG. 3 is a block diagram illustrating components used for Data Evaluation 135 based on device vulnerability, according to one embodiment disclosed herein. In the illustrated embodiment, the Data Evaluation 135 includes components and/or blocks for Vulnerability Extraction 305, Vulnerability Similarity 310, Device Classification 315, Weighting Determination 320, Data Extraction 325, and Data Output 330. Further, as illustrated, the Data Evaluation 135 utilizes information about each IoT Device 150 from the Vulnerability Storage 230 and data stored in the Data Storage 260, and outputs the resulting weighted data to the Data Analysis 265. Although illustrated as discrete units for clarity, in embodiments, the operations of each component or block may be combined or distributed among any number of logical units. Further, the operations of each unit can be implemented in software, hardware, or a combination of software and hardware.

In the illustrated embodiment, the Vulnerability Extraction 305 retrieves the vulnerability measures for each IoT Device 150 from the Vulnerability Storage 230. In an embodiment, the Vulnerability Similarity 310 involves determining how similar the vulnerability profiles of the IoT Devices 150 are. In one embodiment, determining the similarity measure between IoT Devices 150 includes computing the cosine similarity between the vulnerability vectors associated with each device. Once these similarity scores have been computed, the component for Device Classification 315 generates one or more groupings for the IoT Devices 150. In an embodiment, the Device Classification 315 categorizes or classifies each IoT Device 150 into respective groups based on the similarity measures. In one embodiment, two IoT Devices 150 are added to a group if their similarity measure meets or exceeds a predefined threshold. In some embodiments, the devices are clustered using one or more clustering algorithms, based on their vulnerability measures.

In the illustrated embodiment, the Weighting Determination 320 comprises determining the evidentiary value of each device, based in part on the number of devices in the corresponding group. In one embodiment, relatively smaller weighting factors are assigned to groups having relatively larger numbers of devices, and relatively larger weights are applied to groups having relatively fewer devices. In some embodiments, the weighting is also determined based in part on the risk levels of each group. As discussed above, in some embodiments, a risk level for each IoT Device 150 is generated based on the risks of each vulnerability the IoT Device 150 is subject to. In some embodiments, a risk level for the overall group is also generated by aggregating (e.g., summing or averaging) the risk levels of the included devices. In some embodiments, a lower weighting factor is assigned to groupings with a higher risk factor.

As illustrated, in one embodiment, the Data Extraction 325 retrieves data from the Data Storage 260. In some embodiments, the Data Extraction 325 retrieves data from a predefined window of time (e.g., data that was recorded during the window). In some embodiments, the Data Extraction 325 also limits the retrieved data to a predefined geographical area. For example, in one embodiment, the Data Extraction 325 retrieves data from an identified set of devices that were within the defined area at the defined time (or that transmitted data during the defined time). In some embodiments, the Device Classification 315 is also based on this location information. That is, in some embodiments, when classifying devices and determining weighting factors for each group, the Data Evaluation 135 considers only devices that are within a predefined area, rather than all IoT Devices 150. In the illustrated embodiment, the Data Output 330 applies the determined weights to adjust the evidentiary value of each piece of data based on the device that transmitted it, and outputs the data for further processing.

Figure 4:
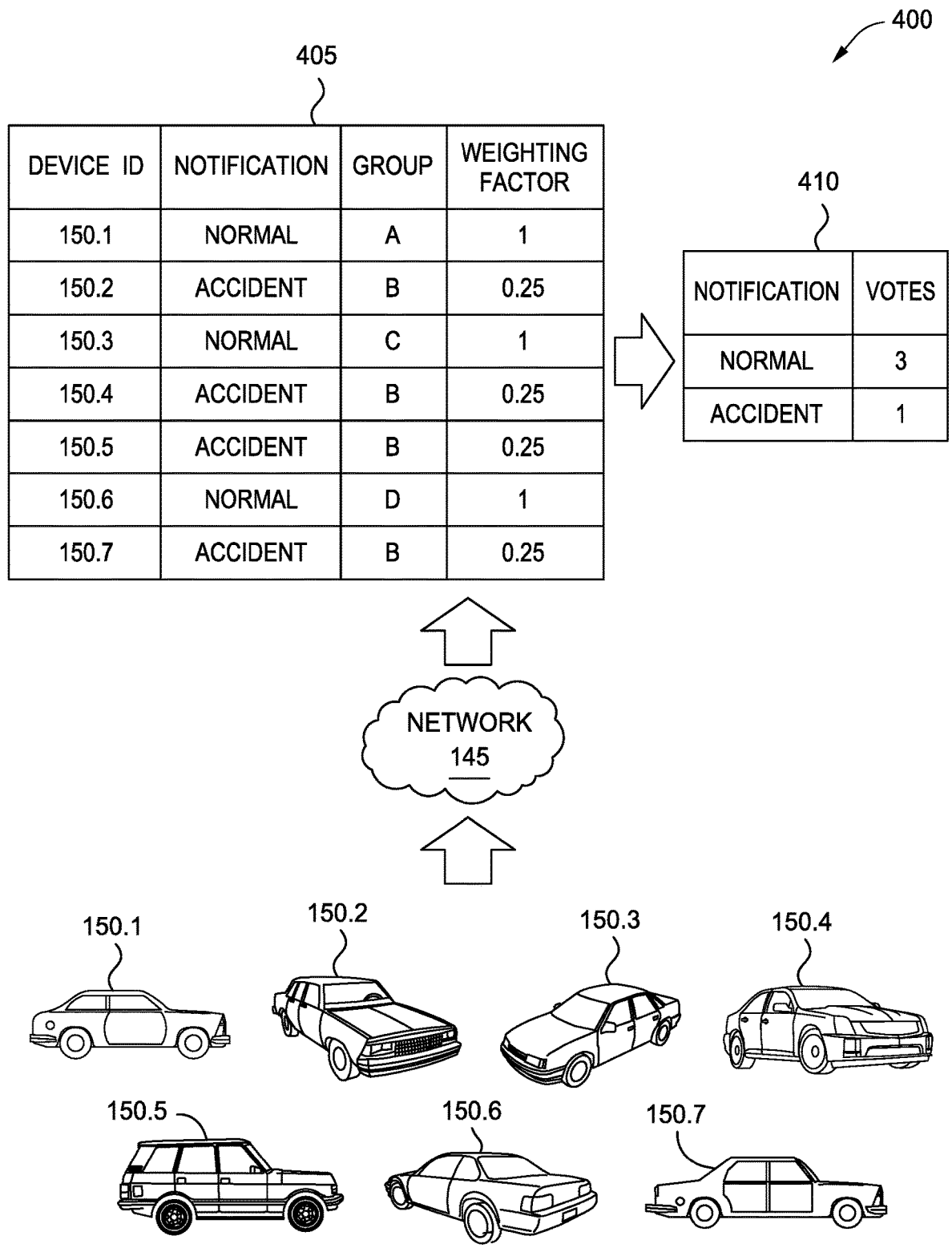
FIG. 4 illustrates a system configured to evaluate data and determine event probabilities based on device vulnerability, according to one embodiment disclosed herein.

FIG. 4 illustrates a system 400 configured to evaluate data and determine probable states of the environment based on device vulnerability, according to one embodiment disclosed herein. As illustrated, a number of IoT Devices 150.1 to 150.7 transmit sensor data via a Network 145 to the IoT Management Device 105. In the illustrated embodiment, the IoT Devices 150 are cars, and the sensor data is an indication as to current traffic conditions. Specifically, in the illustrated embodiment, the data indicates whether traffic is proceeding normally, or whether there is an accident. In embodiments, the data could also include the current speed of the respective IoT Device 150, the speed of other objects identified by the IoT Device 150, weather status, status of the device itself, and the like.

As illustrated in the table 405, the IoT Devices 150.1, 150.3, and 150.6 have reported that traffic is "normal." Additionally, the IoT Devices 150.2, 150.4, 150.5, and 150.7 reported that an accident has occurred. Further, in the illustrated embodiment, IoT Device 150.1 is in group "A," IoT Devices 150.2, 150.4, 150.5, and 150.7 are included in group "B," IoT Device 150.3 is in group "C," and IoT Device 150.6 is in group "D." As discussed above, in embodiments, IoT Devices 150 are grouped based on their respective vulnerability measures (e.g., which vulnerabilities they are affected by). That is, in the illustrated embodiment, IoT Devices 150.1, 150.3, and 150.6 are not similar to any other device in the area, with respect to their vulnerabilities. In contrast, the IoT Devices 150.2, 150.4, 150.5, and 150.7 are all similar to each other, with respect to their vulnerabilities. As illustrated, groups A, C, and D are therefore associated with a weighting factor of one, while group B is associated with a weighting factor of 0.25 (e.g., 25%). As discussed above, in some embodiments, the weighting factor is based on the number of devices in the respective group.

In some embodiments, the weighting factor is inversely proportional to the number of devices. In this way, rather than treating the data from each individual IoT Device 150 with equal evidentiary weight, the data from individual device is weighted or adjusted such that data from each overall group is treated with equal evidentiary weight. For example, in such an embodiment, if a group has fifty devices in it, the weighting factor is $\frac{1}{50}$, or 0.02. Thus, in the illustrated embodiment, because groups A, C, and D each have a single IoT Device 150, their corresponding weight is one. Further, because group B includes four devices, the weighting factor of the group is one fourth, or 0.25. In the illustrated embodiment, the majority of IoT Devices 150 (four out of seven) have reported that an accident has occurred. However, as illustrated in table 410, when the weighting factors are applied, there are three "votes" or notifications indicating that the traffic is normal, and only one vote or notification indicating that there has been an accident.

In this way, embodiments of the present disclosure ensure improved diversity of the data, in terms of the vulnerabilities associated with each device. That is, by utilizing the particular techniques disclosed herein to generate and apply the weights, the IoT Application 130 can ensure that the aggregated data, which is used to determine the conditions at the specified area, is retrieved from a set of devices that is diverse in terms of the vulnerabilities or risks associated with each device. This can reduce the efficacy of attacks, and improve data security. In some embodiments, based on the aggregated data, the IoT Application 130 determines the state of the environment (e.g., whether an event has occurred). In one embodiment, the IoT Application 130 concludes that the alternative with the most votes (or highest score) has occurred. In some embodiments, the IoT Application 130 determines whether the score exceeds a predefined threshold prior to concluding that the event has occurred or the state is an accurate representation of the surroundings. Further, in some embodiments, the IoT Application 130 determines a probability or likelihood that the indicated state is accurate, based on the aggregated data.

In various embodiments, the IoT Application 130 can take a number of actions based on the determined events. For example, if an accident is reported, the IoT Application 130 can provide an indication to an administrator. In some embodiments, the IoT Application 130 can further take action such as requesting an emergency response team be sent to the location. Additionally, in some embodiments, the IoT Application 130 can send notifications to one or more users of an IoT Device 150 in the area, modify services (e.g., adjust the planned route provided to IoT Devices 150), cause or instruct an IoT Device 150 to modify its state (such as by actuating one or more actuators) and the like. Further, in some embodiments, the IoT Application 130 can allocate or reallocate resources (including physical resources and computing resources) based on the determined events. For example, if snow is reported, the IoT Application 130 can allocate (or request allocation) of snow plows and salt trucks for the identified area. In a factory embodiment, the IoT Application 130 may reassign or modify workload at various points in the factory, automatically trigger repair requests, halt operations, change production plans, and the like, based on the determined state of the environment.

Figure 5:
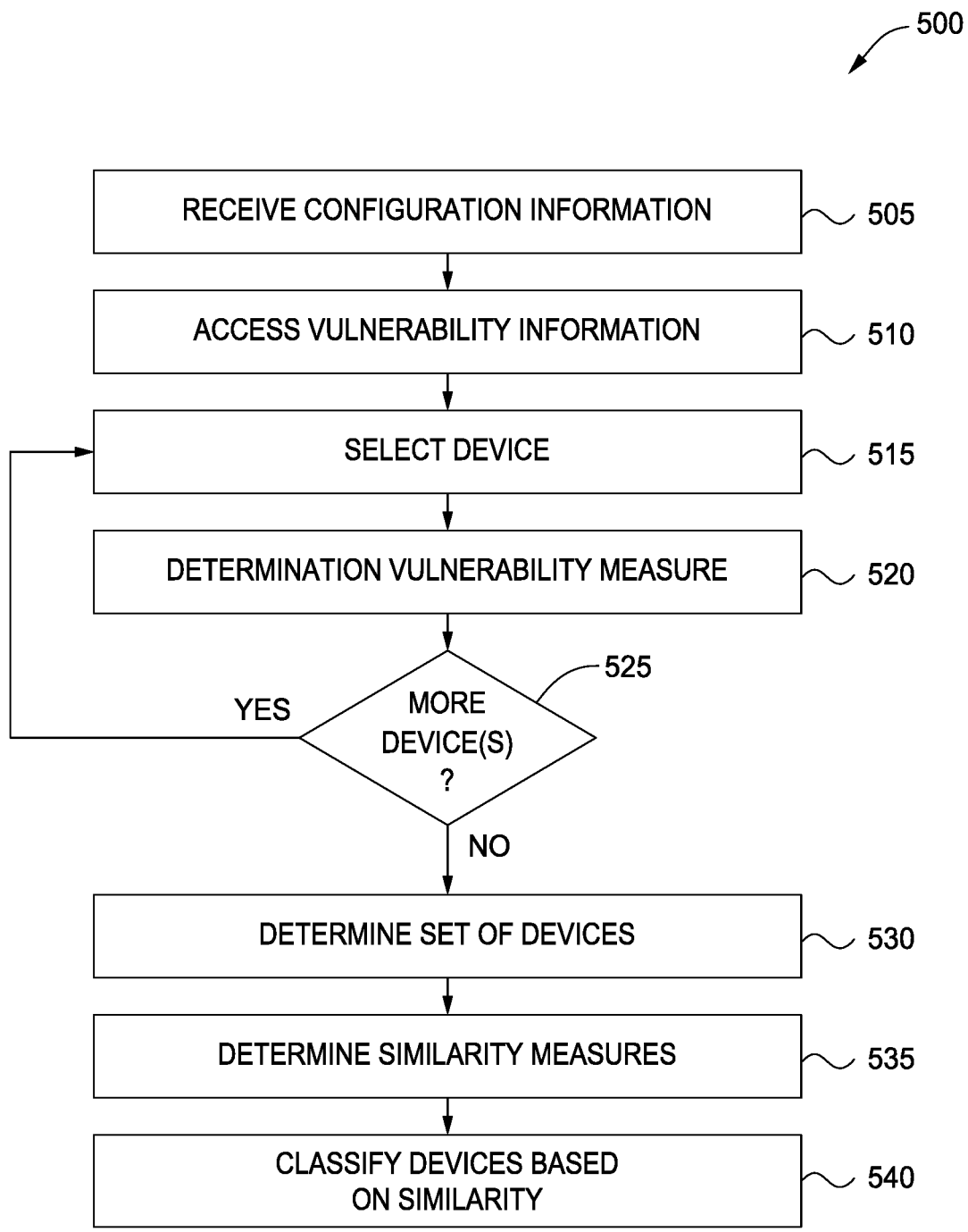
FIG. 5 is a flow diagram illustrating a method of classifying devices based on vulnerability, according to one embodiment disclosed herein.

FIG. 5 is a flow diagram illustrating a method 500 of classifying devices based on vulnerability, according to one embodiment disclosed herein. The method 500 begins at block 505, where the IoT Application 130 receives configuration information from one or more IoT Devices 150. As discussed above, in some embodiments, the IoT Application 130 requests this configuration information, while in others, the information is transmitted without a request. Further, in embodiments, the configuration information can be received from the IoT Devices 150 themselves, or from one or more other sources (such as an administrator or device management system).

At block 510, the IoT Application 130 accesses vulnerability information. For example, in one embodiment, the IoT Application 130 retrieves the vulnerability information from a remote data store that provides information about known vulnerabilities and the device(s) and/or configuration(s) that are affected. The method 500 then proceeds to block 515, where the IoT Application 130 selects a first device from the set of devices for which configuration information has been received. At block 520, the IoT Application 130 determines a vulnerability measure for the selected device. In one embodiment, the vulnerability measure includes an indication as to which vulnerabilities, if any, the device is affected by. In one embodiment, the vulnerability measure is an n-dimensional vector, where each of the n dimensions corresponds to a particular vulnerability. In some embodiments, the vulnerability measure also includes a level of risk associated with each vulnerability, as well as an overall risk profile for the IoT Device 150.

The method 500 then continues to block 525, where the IoT Application 130 determines whether there are additional devices that have not yet been profiled. As discussed above, in some embodiments, revised or new configuration information is received when an IoT Device 150 updates its configuration. In such an embodiment, the IoT Application 130 similarly generates a new vulnerability measure for the device. If at least one additional device remains, the method 500 returns to block 515. Otherwise, the method 500 continues to block 530.

At block 530, the IoT Application 130 determines a set of IoT Devices 150 to be analyzed and classified. In one embodiment, the IoT Application 130 determines the set of devices based on selecting IoT Devices 150 that provide a certain type of data (e.g., traffic data), or that are all of a certain type (e.g., smart traffic lights). Similarly, in one embodiment, the IoT Application 130 selects IoT Devices 150 that are within a predefined area. In such an embodiment, the IoT Application 130 generates groupings based on the devices which are present in a particular area (or were present at the time the associated data was recorded), as opposed to all IoT Devices 150. In one embodiment, the IoT Application 130 determines the subset of IoT Devices 150 to categorize based on the data that will be aggregated and analyzed. For example, if the task is to determine weather conditions in a particular city at a particular time (or during a particular window), the IoT Application 130 selects from the IoT Devices 150 that recorded weather-related data during the window and in the defined area.

The method 500 then proceeds to block 535, where the IoT Application 130 determines similarity measures with respect to each pair of IoT Devices 150 in the determined set. In one embodiment, the IoT Application 130 determines the similarity based on computing the cosine similarity between vulnerability vectors of each IoT Device 150. The method 500 continues to block 540, where the IoT Application 130 classifies the devices into groups based on the similarity measures. In one embodiment, if the similarity measure between a first and second device exceeds a predefined threshold, the first and second devices are associated with the same group. In some embodiments, the IoT Application 130 are classified into a predefined number of groups. Further, in some embodiments, the IoT Devices 150 are clustered into one or more clusters based on their respective vulnerability measures, using one or more clustering algorithms. For example, in embodiments, various clustering methods, such as the k-means method, the complete linkage method, the group average method, and the like can be utilized to group the IoT Devices 150.

In some embodiments, the IoT Application 130 dynamically determines the set of IoT Devices 150 (and thus dynamically determines the groupings of the devices) during use of the system. For example, in order to determine the current state of the environment at a particular location, the IoT Application 130 may receive data from IoT Devices 150 that are currently in the area over a predefined window of time (e.g., the last minute), cluster or group the devices based on vulnerabilities, and proceed to analyze the data based on the weighted groupings. In order to obtain an updated understanding at a second time, the IoT Application 130 can repeat this grouping process for the IoT Devices 150 that are at the location (or within a predefined area or radius) that recorded and/or transmitted data at the second time (or within a predefined window of time). In this way, the evidentiary value of data from each device is dynamically changed and adjusted, based on the other IoT Devices 150 that are nearby at any given time.

Figure 6:
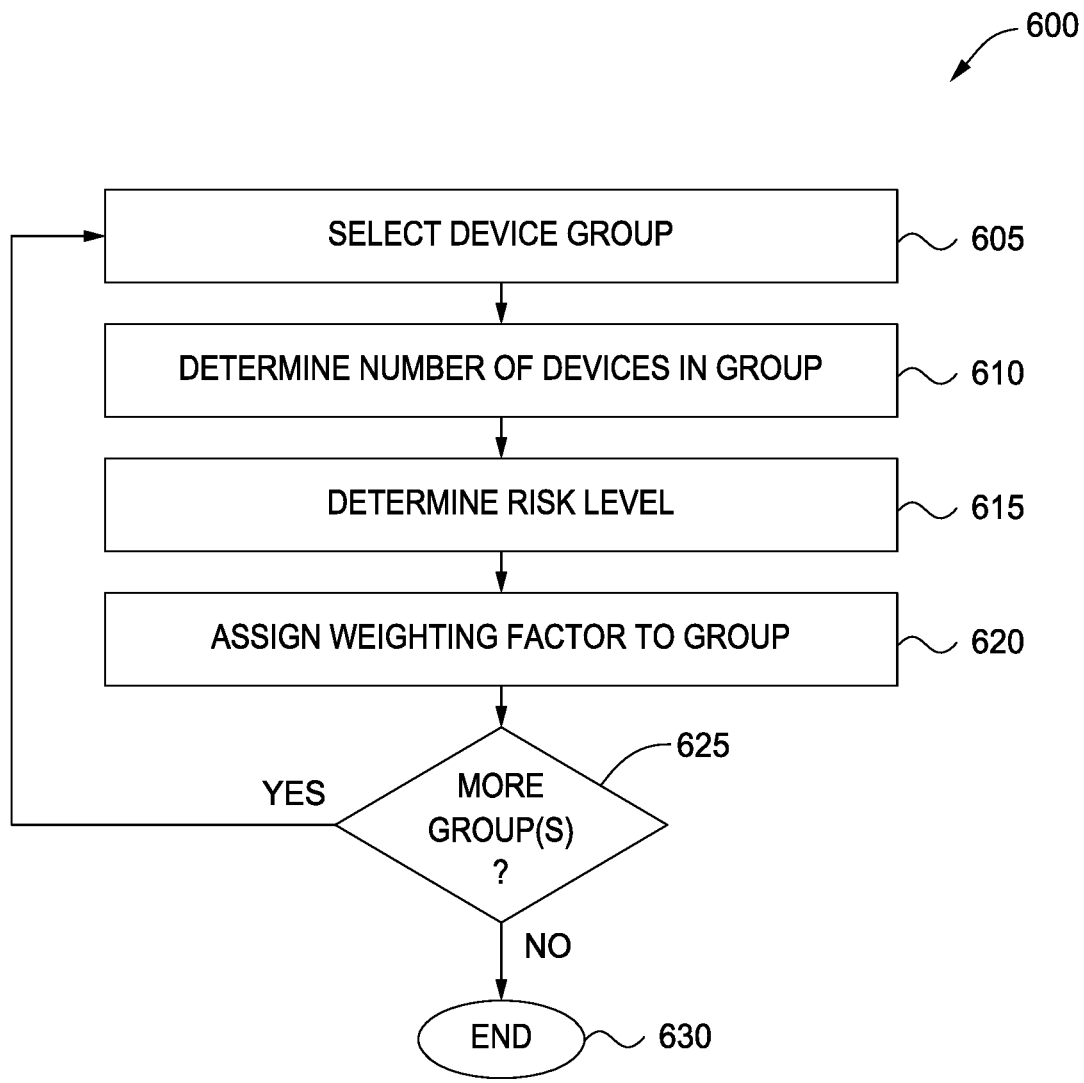
FIG. 6 is a flow diagram illustrating a method of determining weighting factors for device groupings, according to one embodiment disclosed herein.

FIG. 6 is a flow diagram illustrating a method 600 of determining weighting factors for device groupings, according to one embodiment disclosed herein. The method 600 begins at block 605, where the IoT Application 130 selects a first device group from the defined device groupings. At block 610, the IoT Application 130 determines the number of devices present in the group. The method 600 then proceeds to block 615, where the IoT Application 130 determines a risk level of the selected group. As discussed above, in some embodiments, each grouping of devices has an associated risk level that represents the risks associated with each of the IoT Devices 150 in the group. For example, in one embodiment, the risk level of the group is the average risk level of its constituent devices.

At block 620, the IoT Application 130 determines and assigns a weighting factor to the group. In one embodiment, the weighting factor is based on the number of devices in the group. Further, in some embodiments, the weighting factor is based in part on the determined risk level of the grouping. In this way, the data from the IoT Devices 150, when aggregated, is weighted such that the aggregated data represents a diverse set of IoT Devices 150, in terms of their individual vulnerabilities. The method 600 then proceeds to block 625, where the IoT Application 130 determines if there are additional groups to be processed. If so, the method 600 returns to block 605. Otherwise, the method 600 terminates at block 630.

Figure 7:
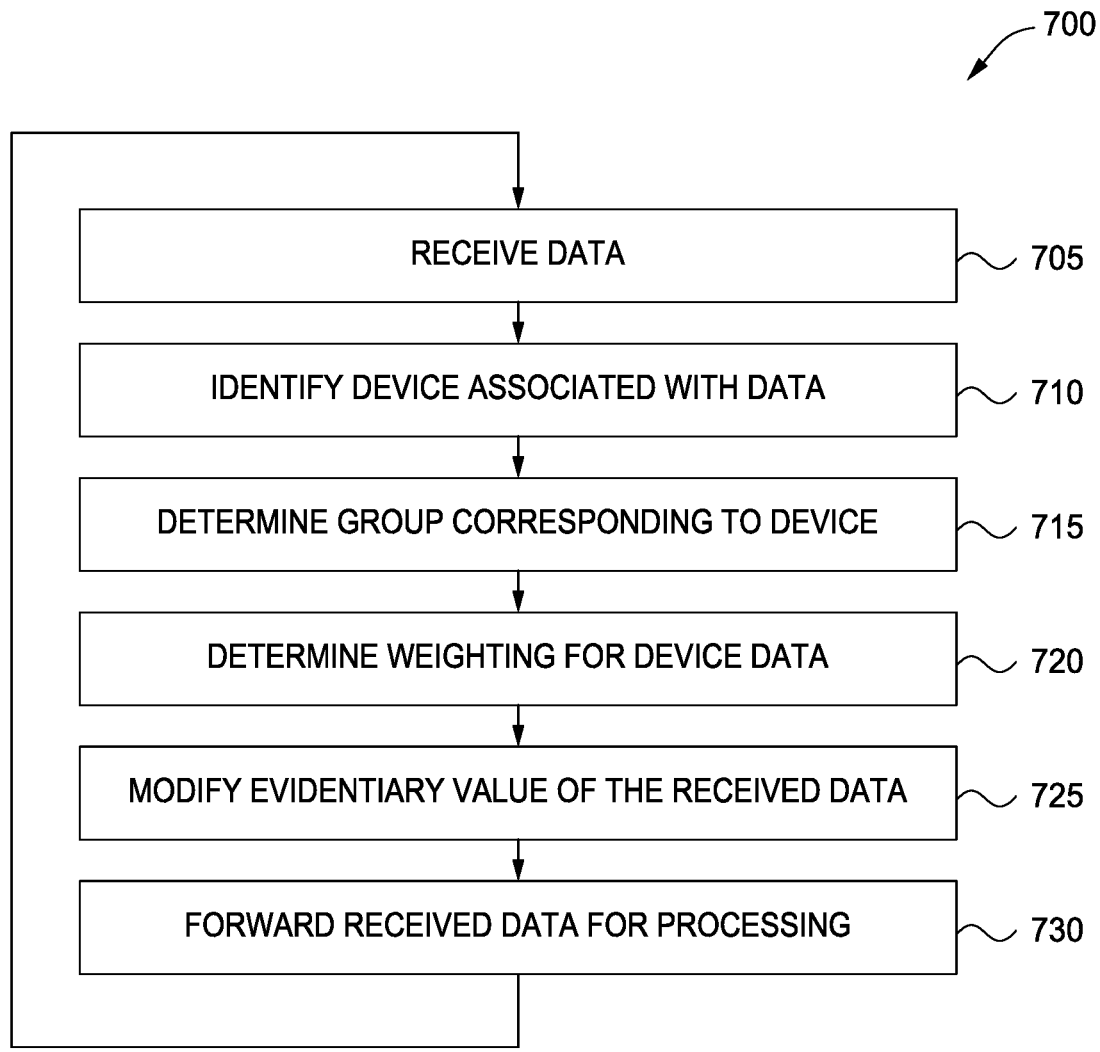
FIG. 7 is a flow diagram illustrating a method of modifying the evidentiary value of data based on weighting information, according to one embodiment disclosed herein.

FIG. 7 is a flow diagram illustrating a method 700 of modifying the evidentiary value of data based on weighting information, according to one embodiment disclosed herein. In the illustrated embodiment, the method 700 begins at block 705, where the IoT Application 130 receives data associated with an IoT Device 150. That is, the IoT Application 130 receives data that an IoT Device 150 recorded and transmitted to the IoT Application 130. In some embodiments, as discussed above, the data is buffered or stored prior to use. In other embodiments, the data is processed in real-time, as it is received. The method 700 then continues to block 710, where the IoT Application 130 identifies the IoT Device 150 that transmitted the data. In one embodiment, the data includes an identifier of associated the IoT Device 150 (e.g., a MAC address, an IP address, or other unique identifier).

Once the IoT Device 150 is identified, the method 700 proceeds to block 715, where the IoT Application 130 identifies the group corresponding to the identified device. As discussed above, in embodiments, the group of the device is based on the vulnerabilities the device is affected by. At block 720, the IoT Application 130 determines the weighting factor for the identified group. The method 700 then continues to block 725, where the IoT Application 130 modifies the evidentiary value of the received data based on the weighting factor. For example, if the weighting factor is one half, the IoT Application 130 may count the data as equivalent to half of a vote, rather than count the data as a full "vote" or response. That is, the IoT Application 130 considers the data from two such devices (each allotted one half of the evidentiary weight of a "normal" device) to have equal weight as data from a device allocated a weight of one.

Finally, at block 730, the data is forwarded for further processing (e.g., to be aggregated with data from other IoT Devices 150 in order to determine the status of the environment). In some embodiments, the method 700 operates on discrete or categorical data, such as whether or not an event has occurred. In embodiments this may include data such as what weather phenomena is occurring (such as rain, snow, windy, clear, and the like), whether traffic is delayed, and the like. In such an embodiment, the data from each of the IoT Devices 150 indicates the status of the corresponding event, as determined by the respective IoT Device 150. For example, each IoT Device 150 can report whether or not traffic is delayed, whether it is raining (and if so, the intensity of the rain), and the like. In some embodiments, the data may be continuous rather than discrete. For example, the velocity of each IoT Device 150 can be aggregated to identify an average speed of the devices in the particular location.

Figure 8:
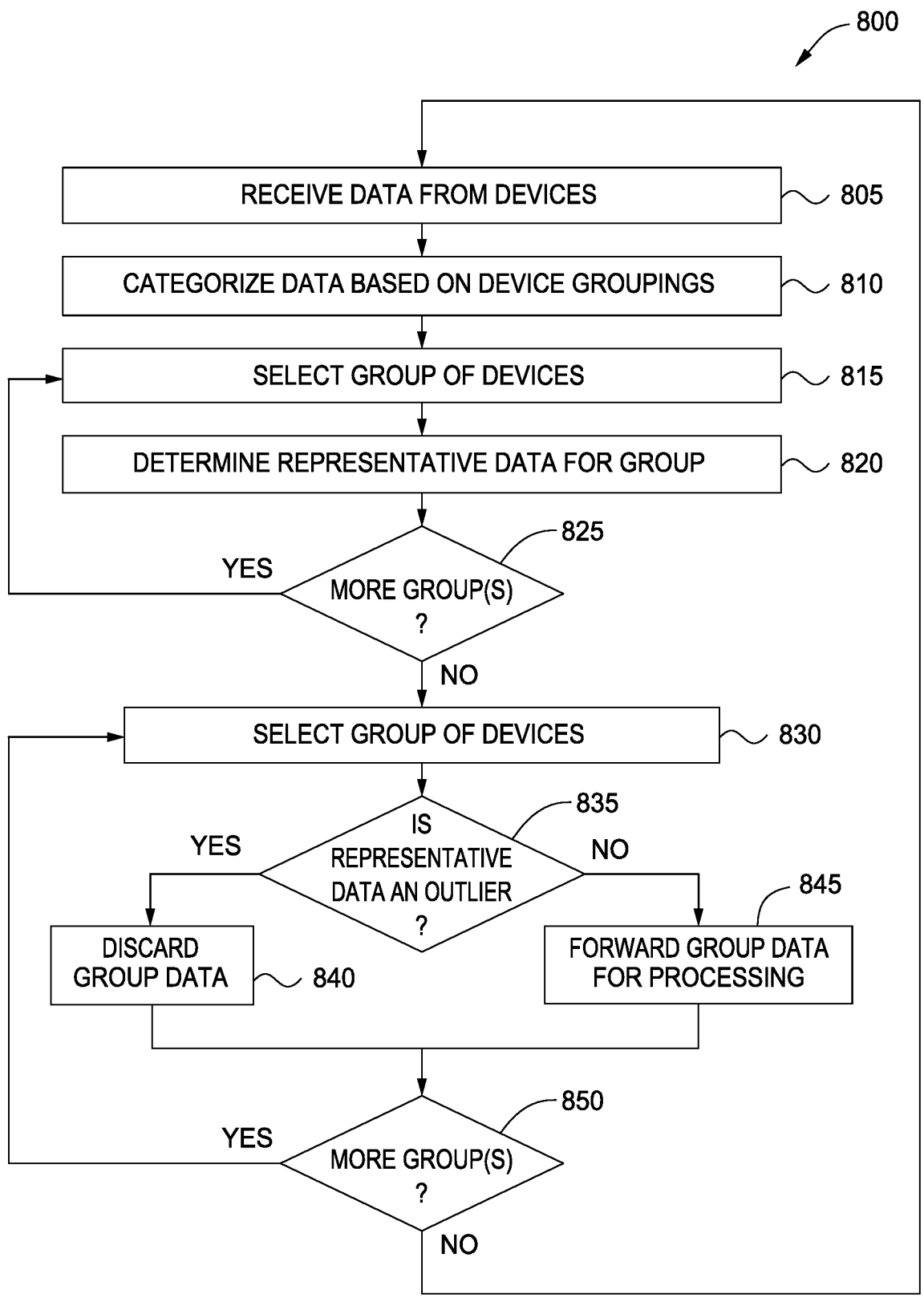
FIG. 8 is a flow diagram illustrating a method of identifying outlier data based on device groupings, according to one embodiment disclosed herein.

FIG. 8 is a flow diagram illustrating a method 800 of identifying outlier data based on device groupings, according to one embodiment disclosed herein. In one embodiment, the method 800 is used to process continuous data, where the data is not a "vote" or report of a particular condition or status. In some embodiments, whether the data is processed via the method 700 or the method 800 is determined based on the type of the data. In some embodiments, an administrator or user selects the appropriate method. Further, in some embodiments, the methods 700 and 800 are both utilized to analyze data. For example, in such an embodiment, the method 800 can be utilized to remove suspicious data, as discussed in more detail below, and a representative value for all of the data can then be determined using the method 700.

The method 800 begins at block 805, where the IoT Application 130 receives data from one or more IoT Devices 150. At block 810, the IoT Application 130 categorizes or classifies the data based on the group corresponding to the device that provided each piece of data. The method 800 then continues to block 815, where the IoT Application 130 selects a first group. At block 820, the IoT Application 130 determines a representative value for the selected group. In one embodiment, the representative value is the average value of the data. For example, if three IoT Devices 150 in a group report their current speeds as 10 mph, 15 mph, and 5 mph, respectively, the IoT Application 130 can determine that the average or representative value for the group is 10 mph.

The method 800 then continues to block 825, where the IoT Application 130 determines whether there is at least one additional group that is yet to be processed. If so, the method 800 returns to block 815. If not, the method 800 proceeds to block 830, where the IoT Application 130 selects a first group in order to determine whether the group is anomalous. At block 835, the IoT Application 130 determines whether the previously-determined representative data value for the group is an outlier. In embodiments, the IoT Application 130 can make this determination using any methodology. For example, in one embodiment, the IoT Application 130 computes the average and/or standard deviation of the representative values for each group (or of the data values provided by each IoT Device 150, regardless of group), and determines whether the selected representative value exceeds a predefined threshold above or below the average.

In the illustrated embodiment, if the representative value is determined to be an outlier, the IoT Application 130 concludes that the group is submitting anomalous data, and the method 800 proceeds to block 840. At block 840, the IoT Application 130 discards the data from IoT Devices 150 included in the group, such that it is not considered during any further processing (e.g., when determining the current average speed of vehicles on a given highway). If, at block 835, the IoT Application 130 determines that the data is not an outlier, the method 800 continues to block 845, where the IoT Application 130 forwards the data received from IoT Devices 150 in the selected group for any further processing. For example, the data may be used to determine the average or aggregate value (such as speed, temperature, and the like) among multiple groups of IoT Devices 150.

At block 850, the IoT Application 130 determines whether there is at least one additional group that has not yet been processed to determine if the group is transmitting anomalous data. If so, the method 800 returns to block 830 to select the next group. If not, the method 800 returns to block 805 to receive additional data for processing. In this way, the IoT Application 130 can identify anomalous data based on whether the overall group of devices is acting anomalously, rather than based on any single device. In embodiments, this can reduce the false-positive rate. For example, if a single IoT Device 150 is reporting a much lower velocity than the others, it may be because the particular IoT Device 150 is slowing to a stop, accelerating to catch up with the others, parked on the side of the road, and the like. Notably, these conditions are valid and the IoT Device 150 is functioning normally. However, if the entire group is reporting lower velocities than other groups, the IoT Application 130 can determine that the constituent IoT Devices 150 may have been compromised, and the data should therefore not be trusted.

Figure 9:
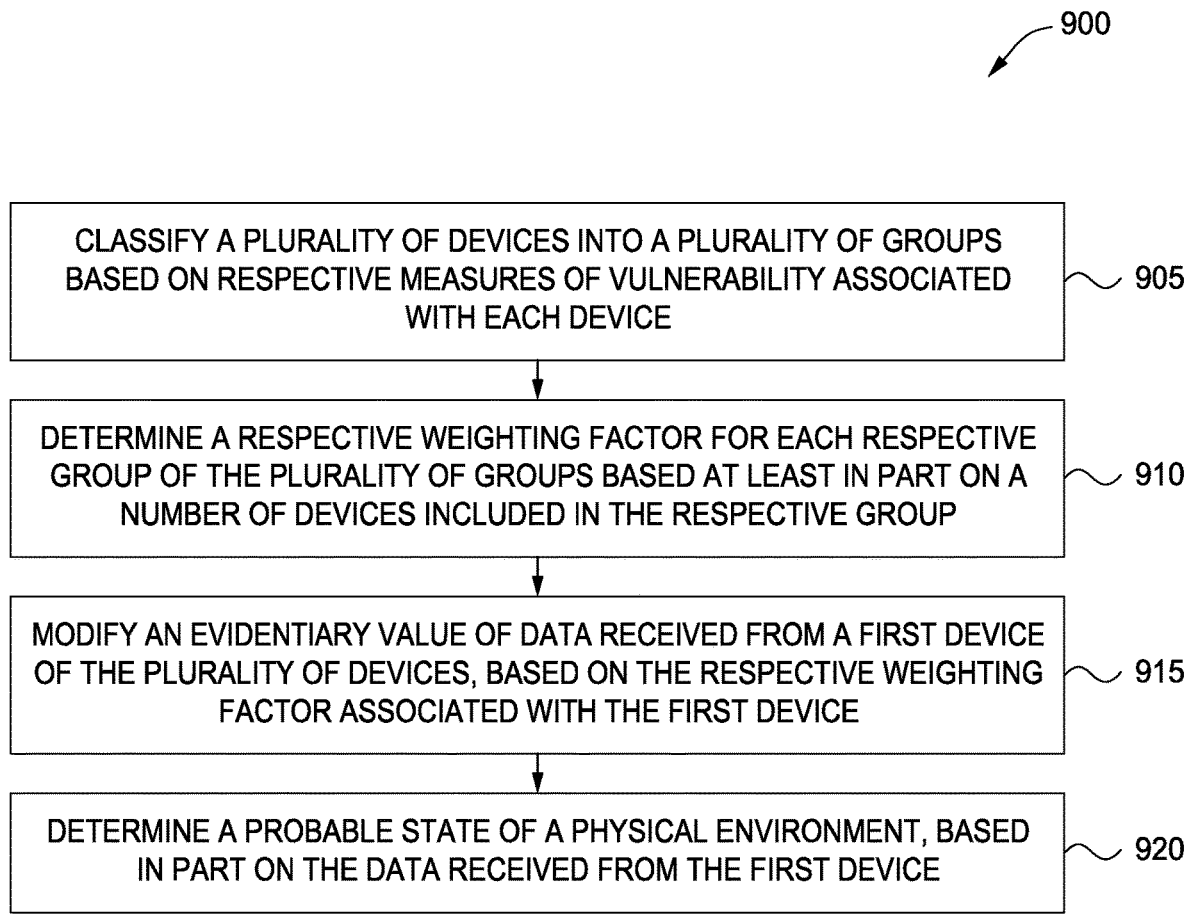
FIG. 9 is a flow diagram illustrating a method of analyzing data based on vulnerability information, according to one embodiment disclosed herein.

FIG. 9 is a flow diagram illustrating a method 900 of analyzing data based on vulnerability information, according to one embodiment disclosed herein. The method 900 begins at block 905, where an IoT Application 130 classifies a plurality of devices into a plurality of groups based on respective measures of vulnerability associated with each device. The method 900 then proceeds to block 910, where the IoT Application 130 determines a respective weighting factor for each respective group of the plurality of groups based at least in part on a number of devices included in the respective group. At block 915, the IoT Application 130 modifies an evidentiary value of data received from a first device of the plurality of devices, based on the respective weighting factor associated with the first device. Finally, the method 900 continues to block 920, where the IoT Application 130 determines a probable state of a physical environment, based in part on the data received from the first device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the IoT Application 130) or related data available in the cloud. For example, the IoT Application 130 could execute on a computing system in the cloud and evaluate data from IoT Devices 150. In such a case, the IoT Application 130 could generate groupings of IoT Devices 150, and store weighting factors for each group at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   classifying, by a data collector, a plurality of devices into a plurality of groups based on respective measures of vulnerability associated with each device;
   determining, by the data collector, a respective weighting factor for each respective group of the plurality of groups based at least in part on a number of devices included in the respective group;
   receiving, at the data collector, data from a first device of the plurality of devices, wherein the first device is affected by one or more vulnerabilities;
   modifying, by the data collector, an evidentiary value of the received data based on the respective weighting factor associated with the first device;
   determining, by the data collector, a probable state of a physical environment, based in part on the data received from the first device; and
   initiating one or more actions, based on the probable state of the physical environment, to improve a state of the physical environment.

2. The method of claim 1, wherein determining the respective weighting factor for a first group of the plurality of groups comprises:
   determining a number of devices included in the first group; and
   setting the respective weighting factor to be inversely proportional to the number of devices included in the first group.

3. The method of claim 1, wherein classifying the plurality of devices into the plurality of groups comprises classifying the first device and a second device into a first group by:
   receiving first and second configurations from the first and second devices;
   determining a first measure of vulnerability for the first device and a second measure of vulnerability for the second device based on the first and second configurations;
   computing a similarity measure between the first and second devices; and
   upon determining that the similarity measure exceeds a predefined threshold, classifying the first and second devices into the first group.

4. The method of claim 3, wherein determining the first measure of vulnerability for the first device comprises comparing the first configuration to a predefined list of known vulnerabilities to determine, for each known vulnerability, whether the first device is affected.

5. The method of claim 4, wherein computing the similarity measure between the first and second devices comprises computing a cosine similarity between the first and second measures of vulnerability.

6. The method of claim 1, wherein modifying an evidentiary value of data received from a first device is further based on a risk factor associated with the first device.

7. The method of claim 1, the method further comprising:
receiving a plurality of data values from a first group of devices;
determining a representative value for the first group of devices, based on the plurality of data values; and
upon determining that the representative value is an outlier, ignoring data received from the first group of devices when analyzing data received from the plurality of devices.

8. A computer program product comprising:
a computer-readable storage medium having computer-readable program code embodied therewith, the computer-readable program code executable by one or more computer processors to perform an operation comprising:
classifying a plurality of devices into a plurality of groups based on respective measures of vulnerability associated with each device;
determining a respective weighting factor for each respective group of the plurality of groups based at least in part on a number of devices included in the respective group;
modifying an evidentiary value of data received from a first device of the plurality of devices, based on the respective weighting factor associated with the first device, wherein the first device is affected by one or more vulnerabilities;
determining a probable state of a physical environment, based in part on the data received from the first device; and
initiating one or more actions, based on the probable state of the physical environment, to improve a state of the physical environment.

9. The computer program product of claim 8, wherein determining the respective weighting factor for a first group of the plurality of groups comprises:
determining a number of devices included in the first group; and
setting the respective weighting factor to be inversely proportional to the number of devices included in the first group.

10. The computer program product of claim 8, wherein classifying the plurality of devices into the plurality of groups comprises classifying the first device and a second device into a first group by:
receiving first and second configurations from the first and second devices;
determining a first measure of vulnerability for the first device and a second measure of vulnerability for the second device based on the first and second configurations;
computing a similarity measure between the first and second devices; and
upon determining that the similarity measure exceeds a predefined threshold, classifying the first and second devices into the first group.

11. The computer program product of claim 10, wherein determining the first measure of vulnerability for the first device comprises comparing the first configuration to a predefined list of known vulnerabilities to determine, for each known vulnerability, whether the first device is affected.

12. The computer program product of claim 11, wherein computing the similarity measure between the first and second devices comprises computing a cosine similarity between the first and second measures of vulnerability.

13. The computer program product of claim 8, wherein modifying an evidentiary value of data received from a first device is further based on a risk factor associated with the first device.

14. The computer program product of claim 8, the operation further comprising:
receiving a plurality of data values from a first group of devices;
determining a representative value for the first group of devices, based on the plurality of data values; and
upon determining that the representative value is an outlier, ignoring data received from the first group of devices when analyzing data received from the plurality of devices.

15. A system comprising:
one or more computer processors; and
a memory containing a program which when executed by the one or more computer processors performs an operation, the operation comprising:
classifying a plurality of devices into a plurality of groups based on respective measures of vulnerability associated with each device;
determining a respective weighting factor for each respective group of the plurality of groups based at least in part on a number of devices included in the respective group;
modifying an evidentiary value of data received from a first device of the plurality of devices, based on the respective weighting factor associated with the first device, wherein the first device is affected by one or more vulnerabilities;
determining a probable state of a physical environment, based in part on the data received from the first device; and
initiating one or more actions, based on the probable state of the physical environment, to improve a state of the physical environment.

16. The system of claim 15, wherein determining the respective weighting factor for a first group of the plurality of groups comprises:
determining a number of devices included in the first group; and
setting the respective weighting factor to be inversely proportional to the number of devices included in the first group.

17. The system of claim 15, wherein classifying the plurality of devices into the plurality of groups comprises classifying the first device and a second device into a first group by:
receiving first and second configurations from the first and second devices;

determining a first measure of vulnerability for the first device and a second measure of vulnerability for the second device based on the first and second configurations;

computing a similarity measure between the first and second devices; and upon determining that the similarity measure exceeds a predefined threshold, classifying the first and second devices into the first group.

18. The system of claim 17, wherein determining the first measure of vulnerability for the first device comprises comparing the first configuration to a predefined list of known vulnerabilities to determine, for each known vulnerability, whether the first device is affected, and wherein computing the similarity measure between the first and second devices comprises computing a cosine similarity between the first and second measures of vulnerability.

19. The system of claim 15, wherein modifying an evidentiary value of data received from a first device is further based on a risk factor associated with the first device.

20. The system of claim 15, the operation further comprising:

receiving a plurality of data values from a first group of devices;

determining a representative value for the first group of devices, based on the plurality of data values; and upon determining that the representative value is an outlier, ignoring data received from the first group of devices when analyzing data received from the plurality of devices.

* * * * *